(12) United States Patent
Park et al.

(10) Patent No.: US 11,539,873 B2
(45) Date of Patent: Dec. 27, 2022

(54) CAMERA APPARATUS AND AUTOFOCUSING METHOD THEREFOR

(71) Applicant: LG INNOTEK CO., LTD., Seoul (KR)

(72) Inventors: Jung Ah Park, Seoul (KR); Seong Yun Cho, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/425,040

(22) PCT Filed: Jan. 21, 2020

(86) PCT No.: PCT/KR2020/000998
§ 371 (c)(1),
(2) Date: Jul. 22, 2021

(87) PCT Pub. No.: WO2020/153703
PCT Pub. Date: Jul. 30, 2020

(65) Prior Publication Data
US 2022/0132043 A1    Apr. 28, 2022

(30) Foreign Application Priority Data
Jan. 22, 2019    (KR) .................. 10-2019-0008168

(51) Int. Cl.
*H04N 5/232*    (2006.01)
*G01S 17/894*   (2020.01)
(Continued)

(52) U.S. Cl.
CPC ....... *H04N 5/232121* (2018.08); *G01B 11/22* (2013.01); *G01S 17/894* (2020.01);
(Continued)

(58) Field of Classification Search
CPC .... H04N 5/232121; H04N 5/247; H04N 9/04; H04N 9/045; H04N 17/002; G01B 11/22;
(Continued)

(56) References Cited

U.S. PATENT DOCUMENTS

2017/0230649 A1    8/2017 Galor Gluskin et al.

FOREIGN PATENT DOCUMENTS

CN    110336942 A  * 10/2019    ............... G06T 5/50
CN    212181480 U  * 12/2020    ............. H04N 5/232
(Continued)

OTHER PUBLICATIONS

Ahn, Seok Hyeon, "Equipping the "iPhone" with Time-of-Flight(TOF) Camera from Next Year", Digitaltoday, Aug. 21, 2018, URL: <http://www.digitaltoday.co.kr/news/articlePrint.html?idxno=202207>, retrieved Apr. 11, 2020, 3 pages.

*Primary Examiner* — Shahbaz Nazrul
(74) *Attorney, Agent, or Firm* — Birch, Stewart, Kolasch & Birch, LLP

(57) ABSTRACT

An auto-focusing method of a camera apparatus according to an embodiment of the present invention comprises the steps of: extracting distance information of an object by using a ToF camera; and performing auto-focusing on an RGB camera by using auto-focusing information according to the distance information, wherein the ToF camera includes an illumination unit for outputting light to the object and a sensor unit for receiving information about light reflected from the object, the sensor unit receives a plurality of pieces of information about the light reflected from the object at a plurality of phases on the basis of the output of the light, and the ToF camera extracts the distance information by using the plurality of pieces of information.

20 Claims, 16 Drawing Sheets

(51) Int. Cl.
  *G01B 11/22*    (2006.01)
  *G03B 13/36*    (2021.01)
  *H04N 5/247*    (2006.01)
  *H04N 9/04*     (2006.01)

(52) U.S. Cl.
  CPC ............. *G03B 13/36* (2013.01); *H04N 5/247* (2013.01); *H04N 9/04* (2013.01)

(58) Field of Classification Search
  CPC ....... G01S 17/894; G01S 17/86; G03B 13/36; G03B 13/20; G03B 3/10
  See application file for complete search history.

(56) References Cited

FOREIGN PATENT DOCUMENTS

| | | | | |
|---|---|---|---|---|
| KR | 10-2018-0019606 A | | 2/2018 | |
| KR | 10-2018-0030437 A | | 3/2018 | |
| VN | 10030963 B | * | 2/2022 | ............. H04N 13/00 |
| WO | WO 2018/232752 A1 | | 12/2018 | |
| WO | WO-2020078440 A1 | * | 4/2020 | ......... H04N 5/23212 |

* cited by examiner

[FIG. 1]
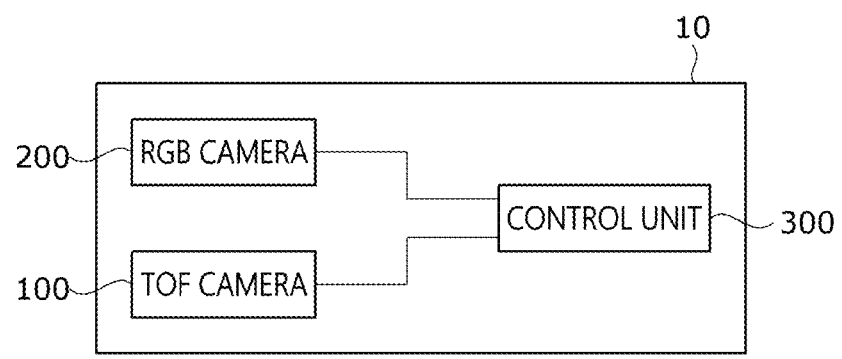
[FIG. 2]
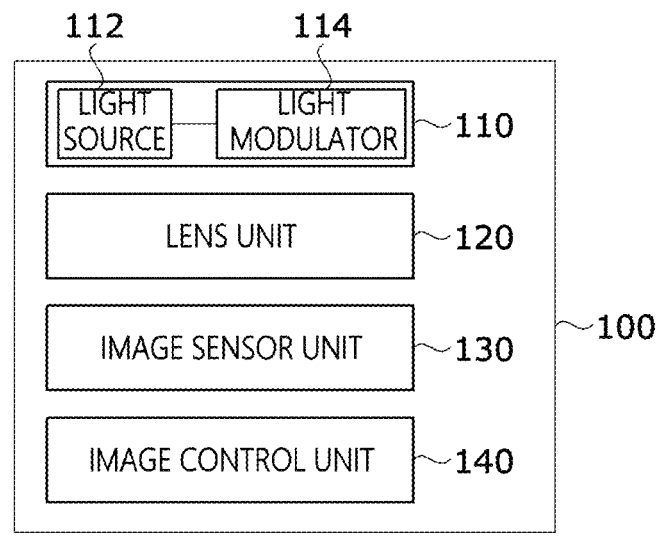

[FIG. 3]
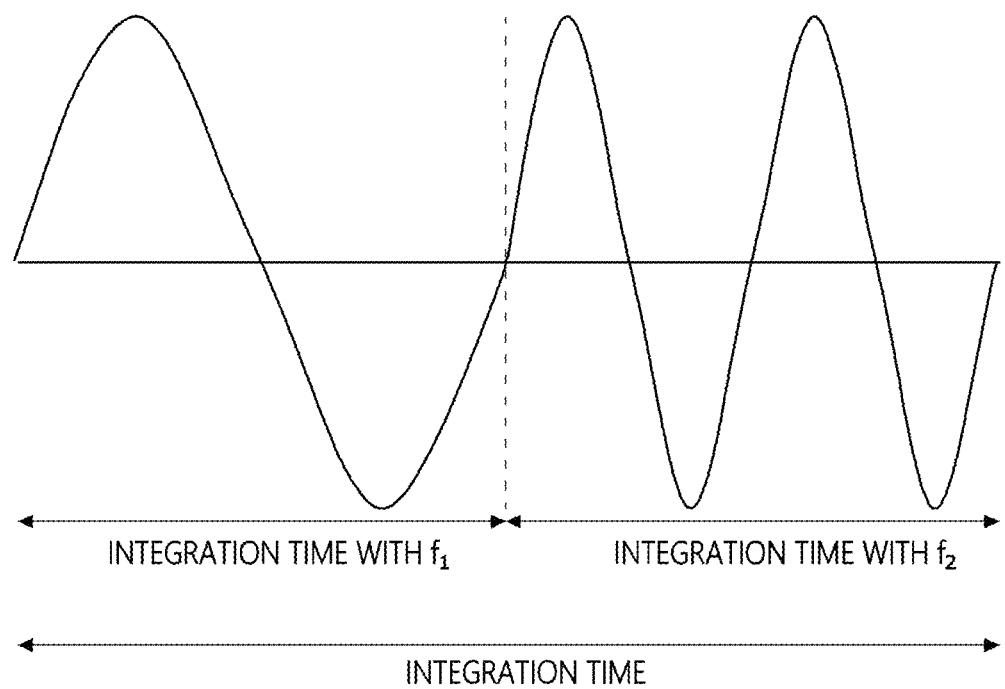

[FIG. 4]
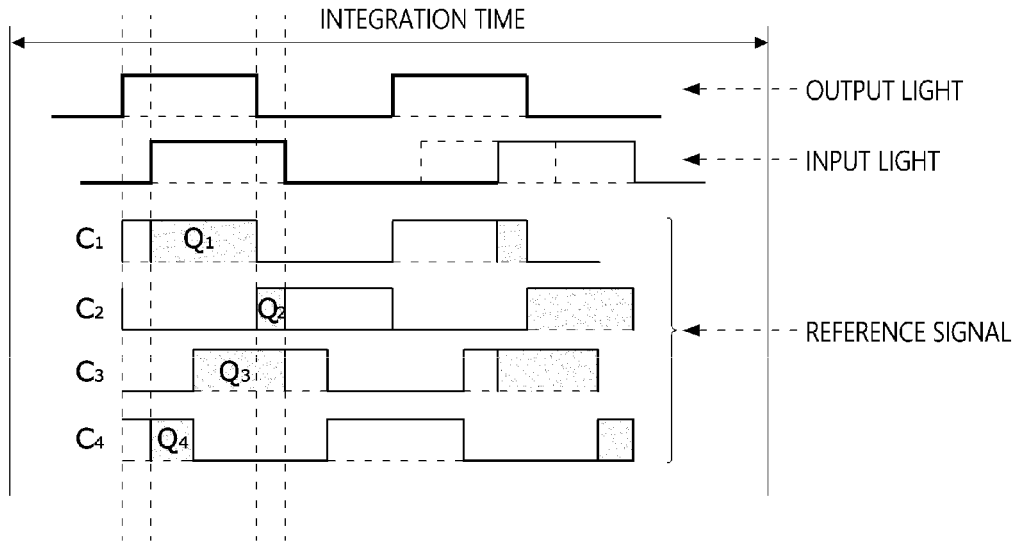
[FIG. 5]
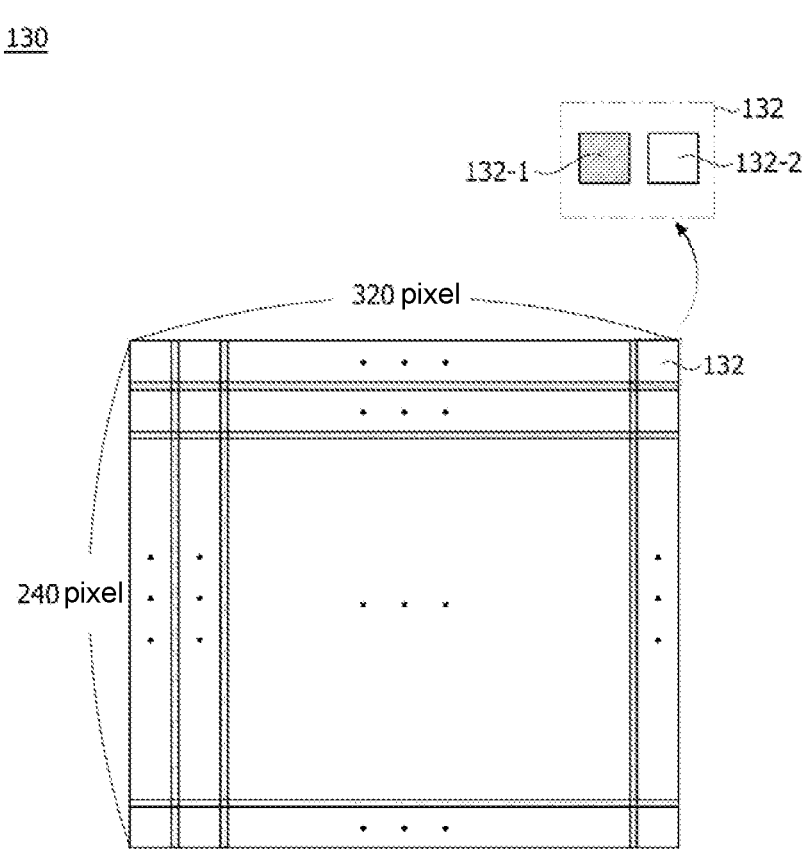

[FIG. 6]
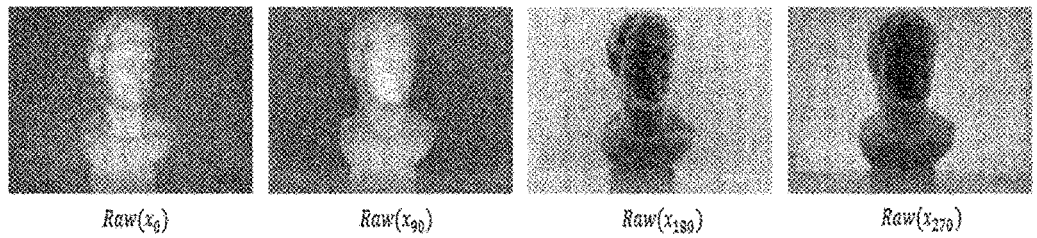
[FIG. 7]
[FIG. 8]
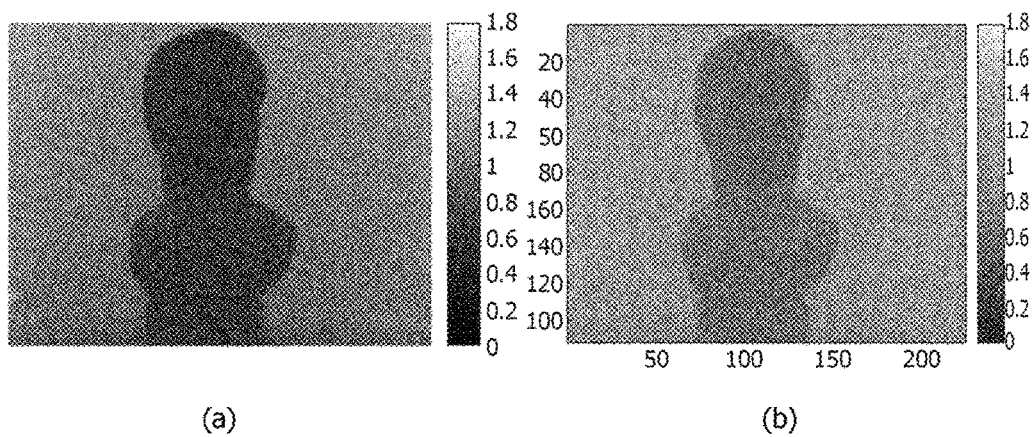
(a)          (b)

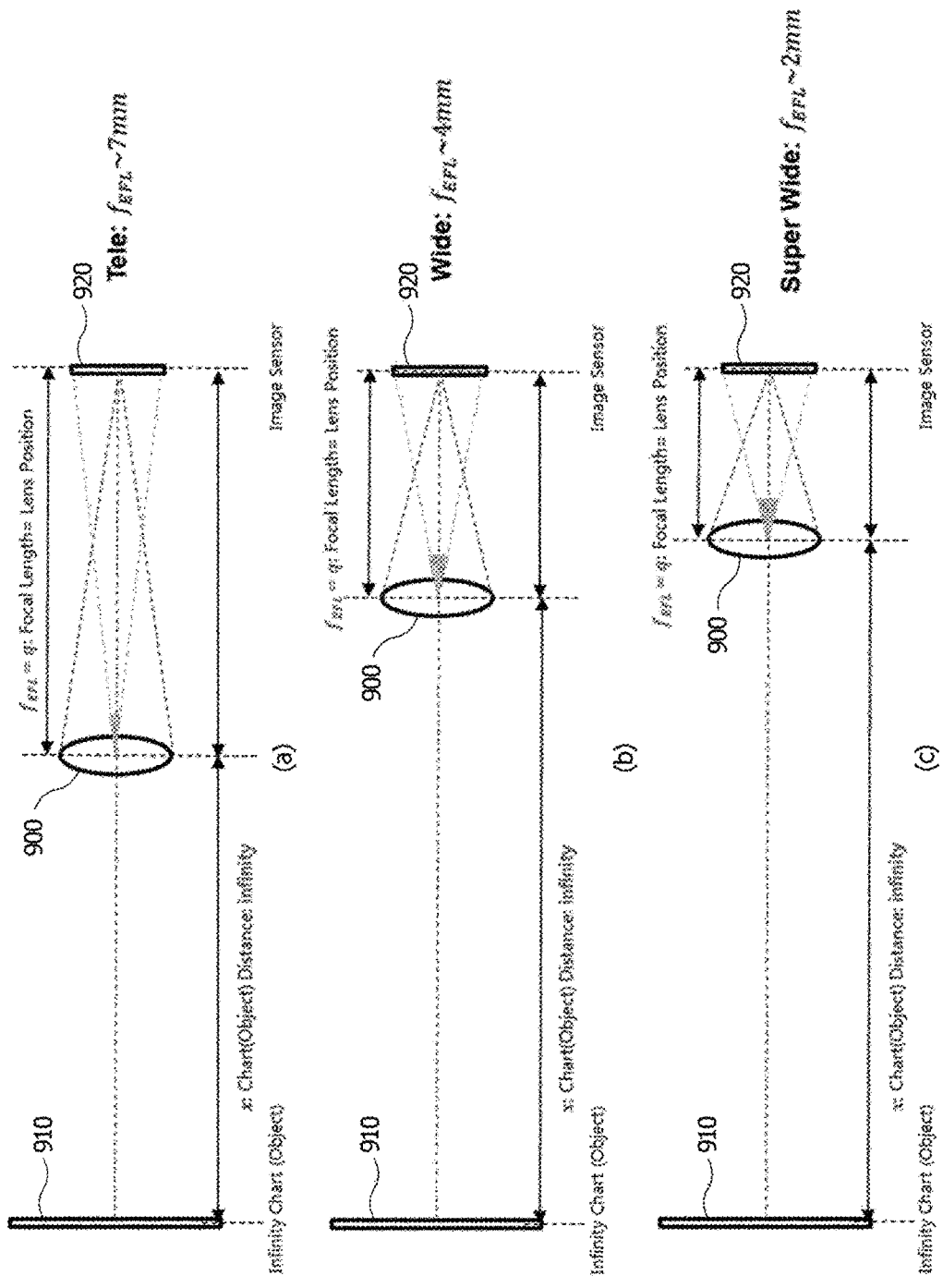
[FIG. 9]

[FIG. 10]
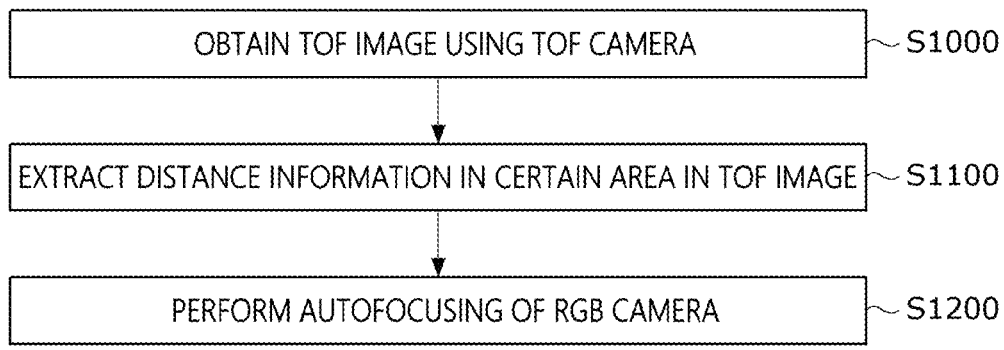
[FIG. 11]
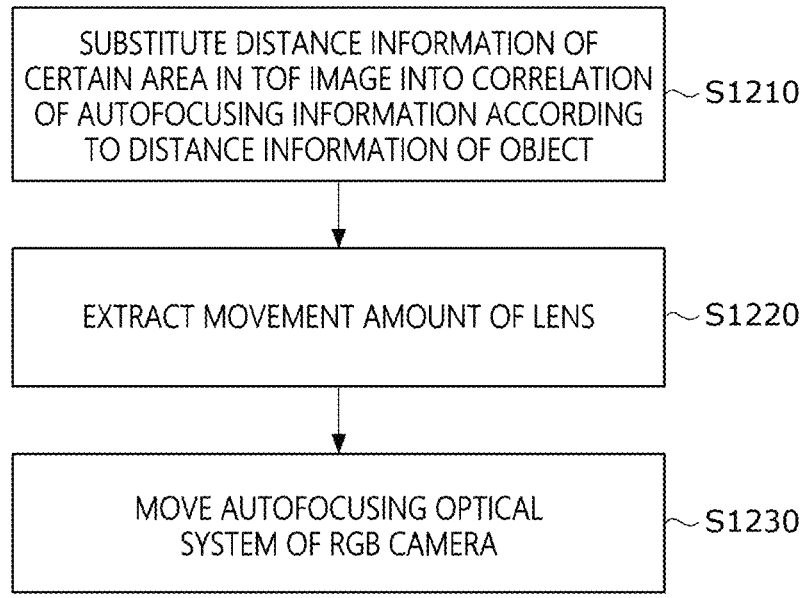

[FIG. 12]
| DISTANCE OF OBJECT (mm) | MOVEMENT AMOUNT OF LENS (mm) | DEPTH (mm) | | | RESOLUTION cal. (DAC) |
|---|---|---|---|---|---|
| 250 | 0.03993 | 197.0 | ~ | 342.8 | 426.565997 |
| 300 | 0.03321 | 226.6 | ~ | 445.2 | 396.8270934 |
| 350 | 0.02842 | 253.8 | ~ | 566.1 | 375.6619308 |
| 400 | 0.02484 | 278.9 | ~ | 710.8 | 359.82992 |
| 450 | 0.02206 | 302.1 | ~ | 887.2 | 347.5408534 |
| 500 | 0.01984 | 323.7 | ~ | 1106.9 | 337.7251312 |
| 550 | 0.01803 | 343.8 | ~ | 1388.2 | 329.7043322 |
| 600 | 0.01652 | 362.6 | ~ | 1761.3 | 323.027365 |
| 650 | 0.01524 | 380.1 | ~ | 2279.6 | 317.3826095 |
| 700 | 0.01415 | 396.6 | ~ | 3048.6 | 312.5478808 |
| 750 | 0.01320 | 412.0 | ~ | 4308.2 | 308.3604926 |
[FIG. 13]
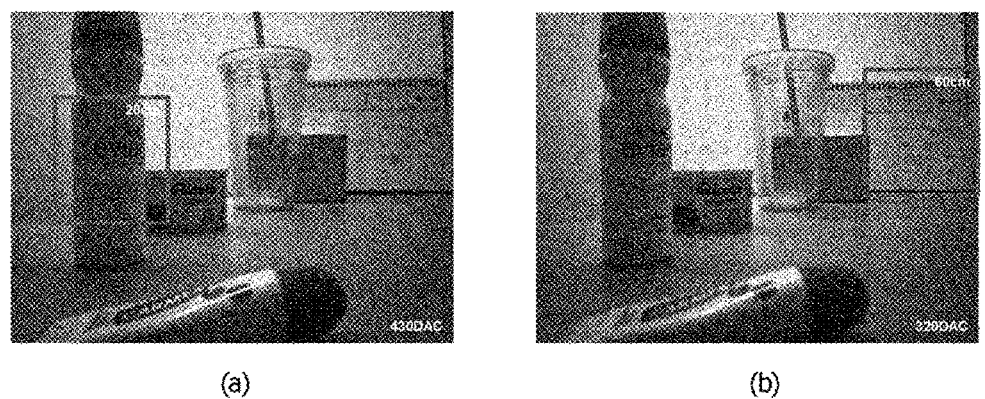
(a)          (b)

[FIG. 14]
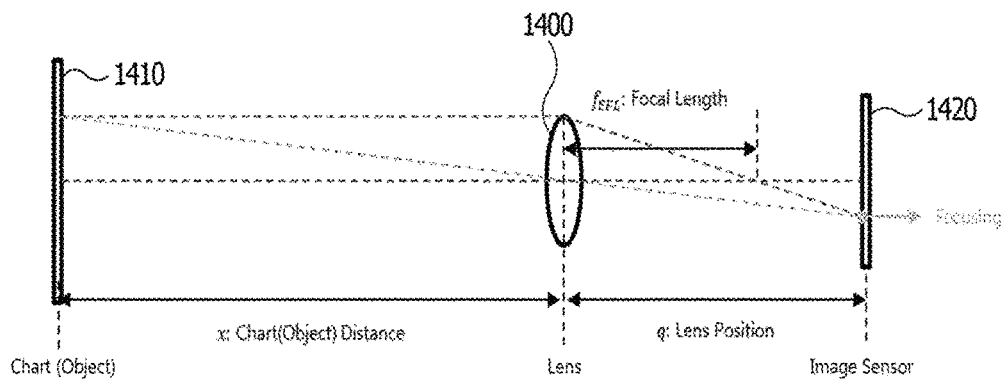
[FIG. 15]
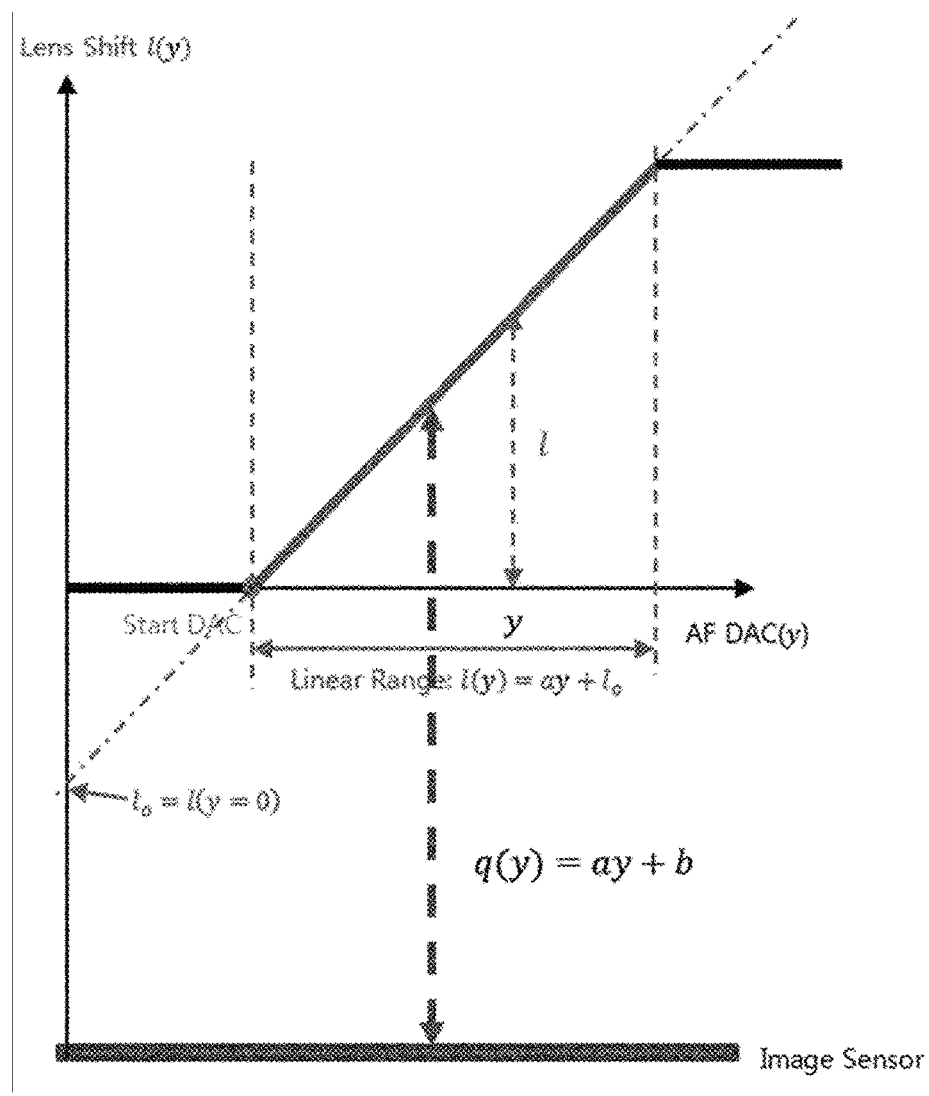

[FIG. 16]
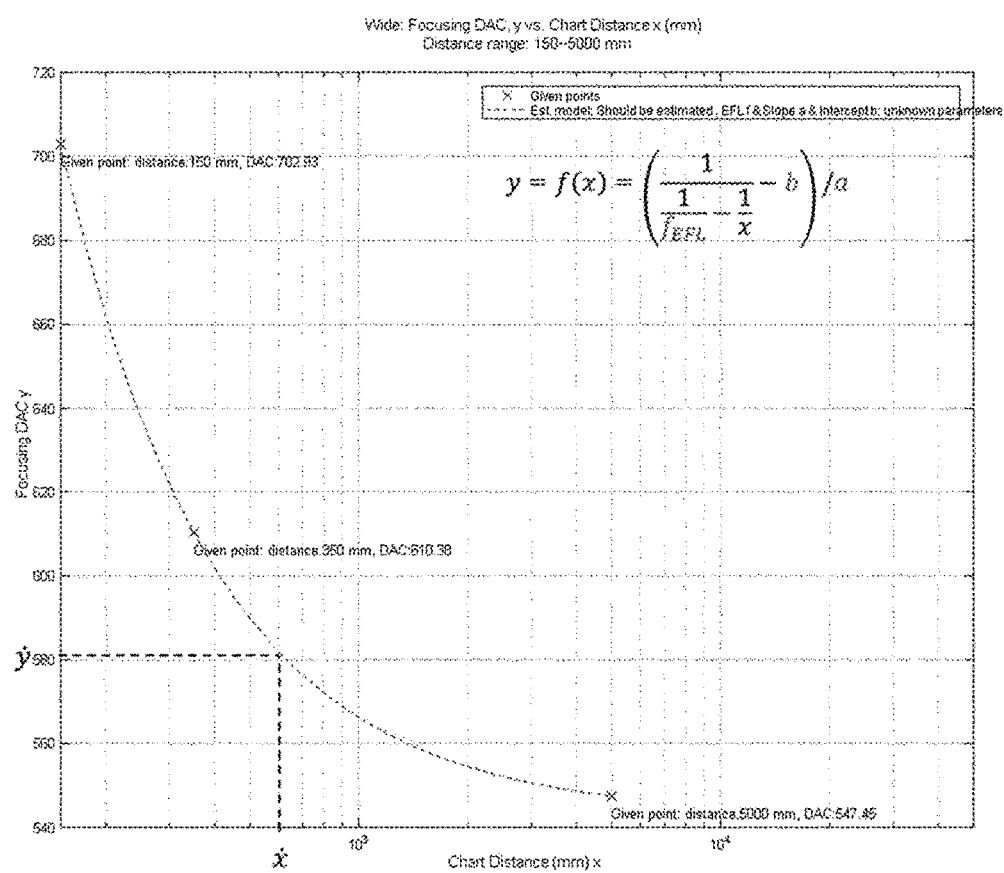

[FIG. 17]

EXAMPLE OF MOVEMENT AMOUNT OF LENS FOR EACH DISTANCE OF OBJECT

| DISTANCE OF OBJECT (mm) | MOVEMENT AMOUNT OF LENS (mm) | DEPTH (mm) | | RESOLUTION cal. (DAC) |
|---|---|---|---|---|
| 250 | 0.03993 | 197.0 | ~ 342.8 | 426.565997 |
| 300 | 0.03321 | 226.6 | ~ 445.2 | 396.8270934 |
| 350 | 0.02842 | 253.8 | ~ 566.1 | 375.6619308 |
| 400 | 0.02484 | 278.9 | ~ 710.8 | 359.82992 |
| 450 | 0.02206 | 302.1 | ~ 887.2 | 347.5408534 |
| 500 | 0.01984 | 323.7 | ~ 1106.9 | 337.7251312 |
| 550 | 0.01803 | 343.8 | ~ 1388.2 | 329.7043322 |
| 600 | 0.01652 | 362.6 | ~ 1761.3 | 323.027365 |
| 650 | 0.01524 | 380.1 | ~ 2279.6 | 317.3826095 |
| 700 | 0.01415 | 396.6 | ~ 3048.6 | 312.5478808 |
| 750 | 0.01320 | 412.0 | ~ 4308.2 | 308.3604926 |

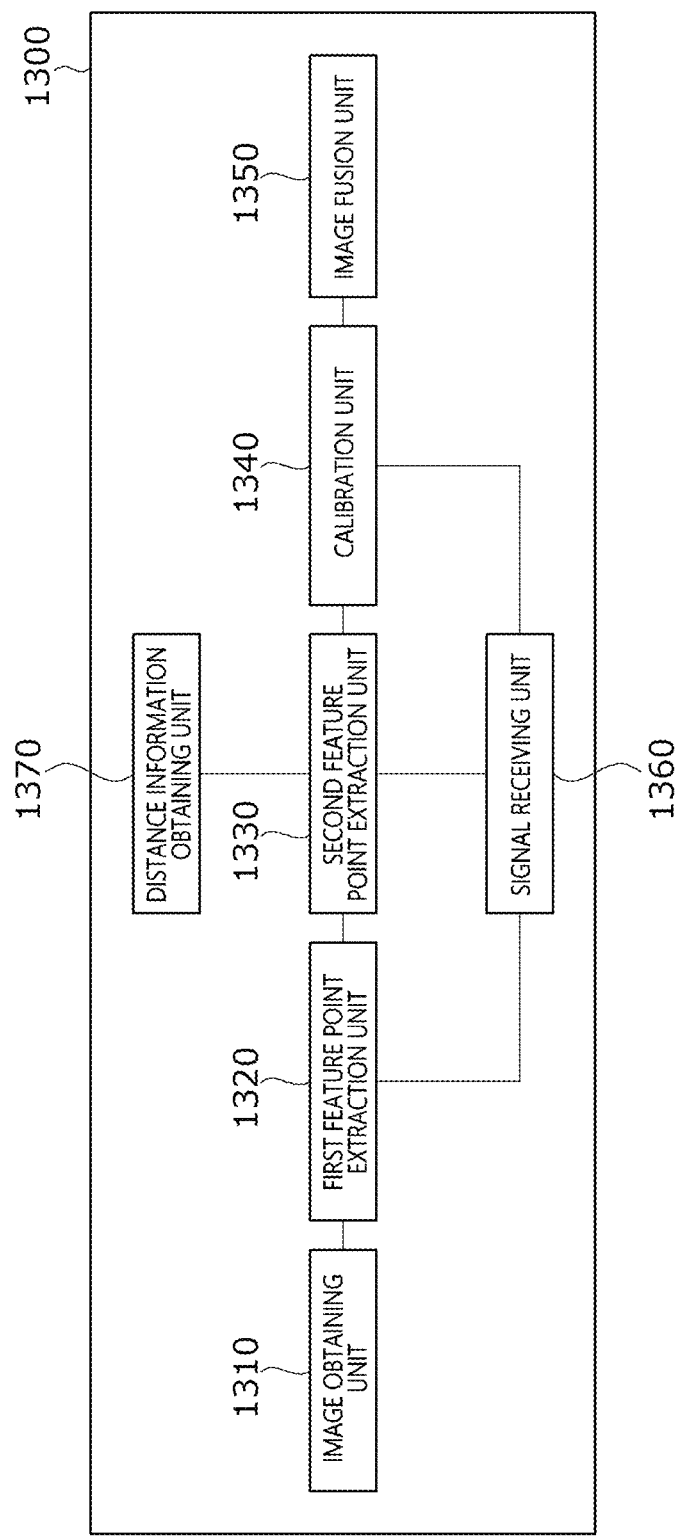
[FIG. 18]

[FIG. 19]
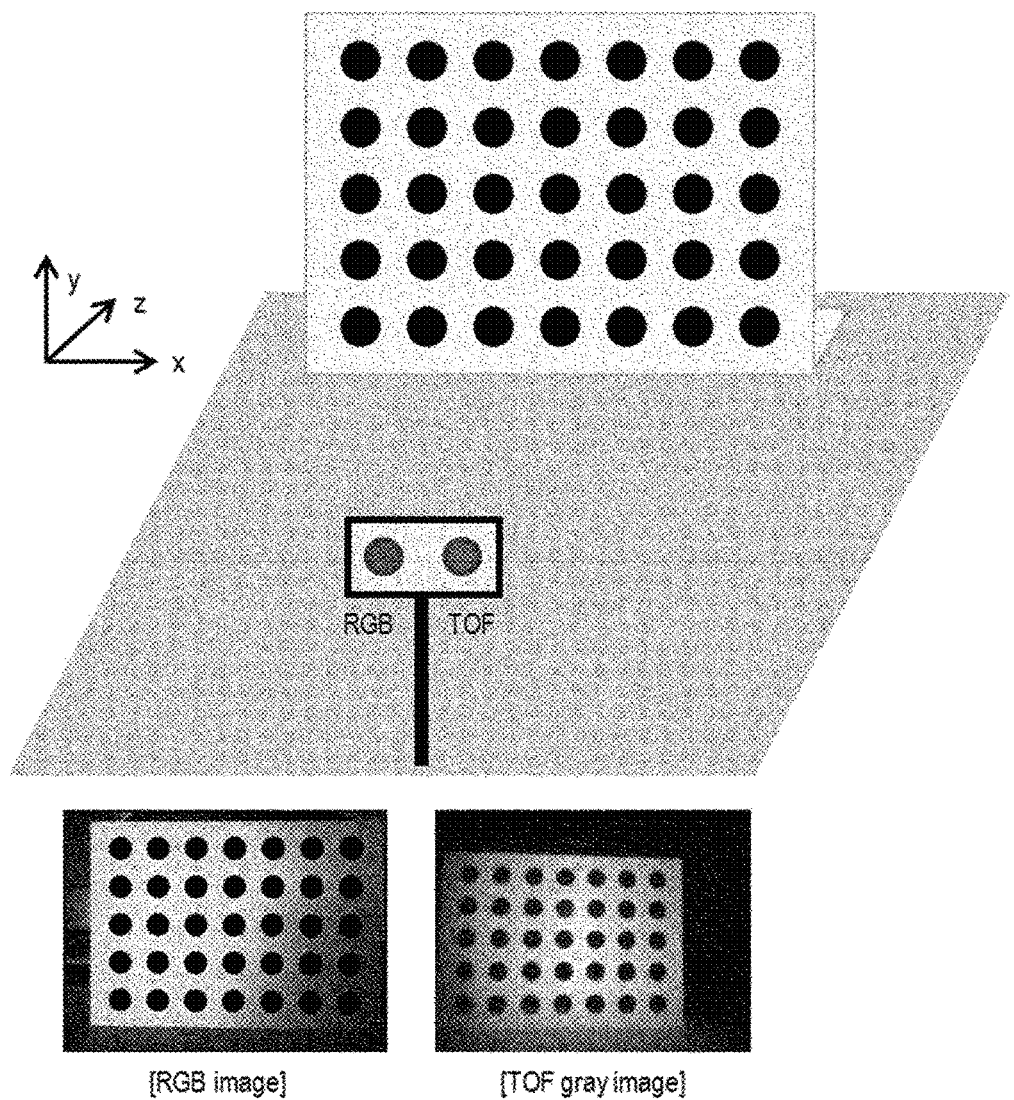

[FIG. 20]
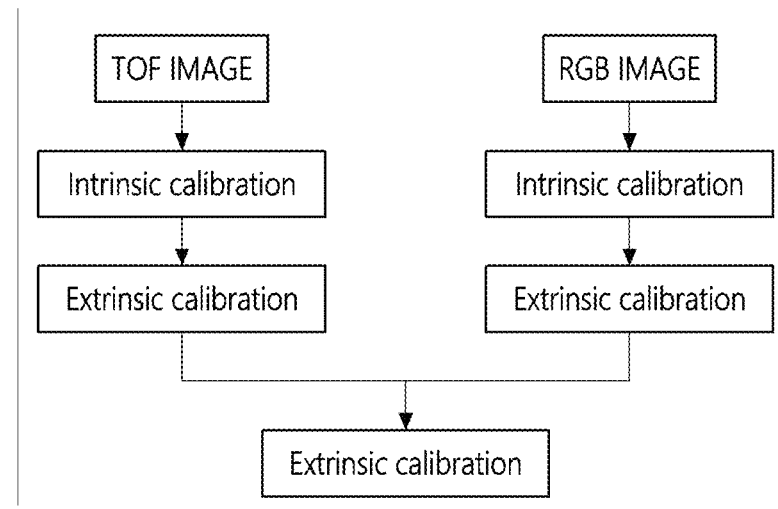

[FIG. 21]
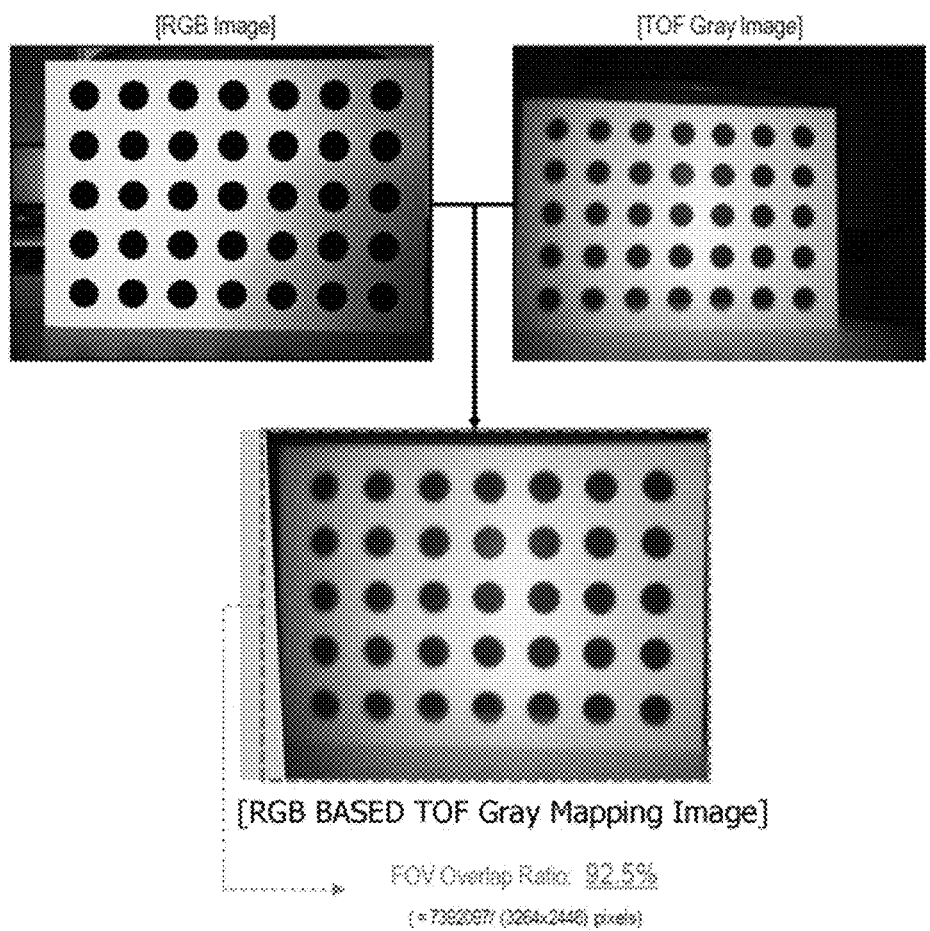

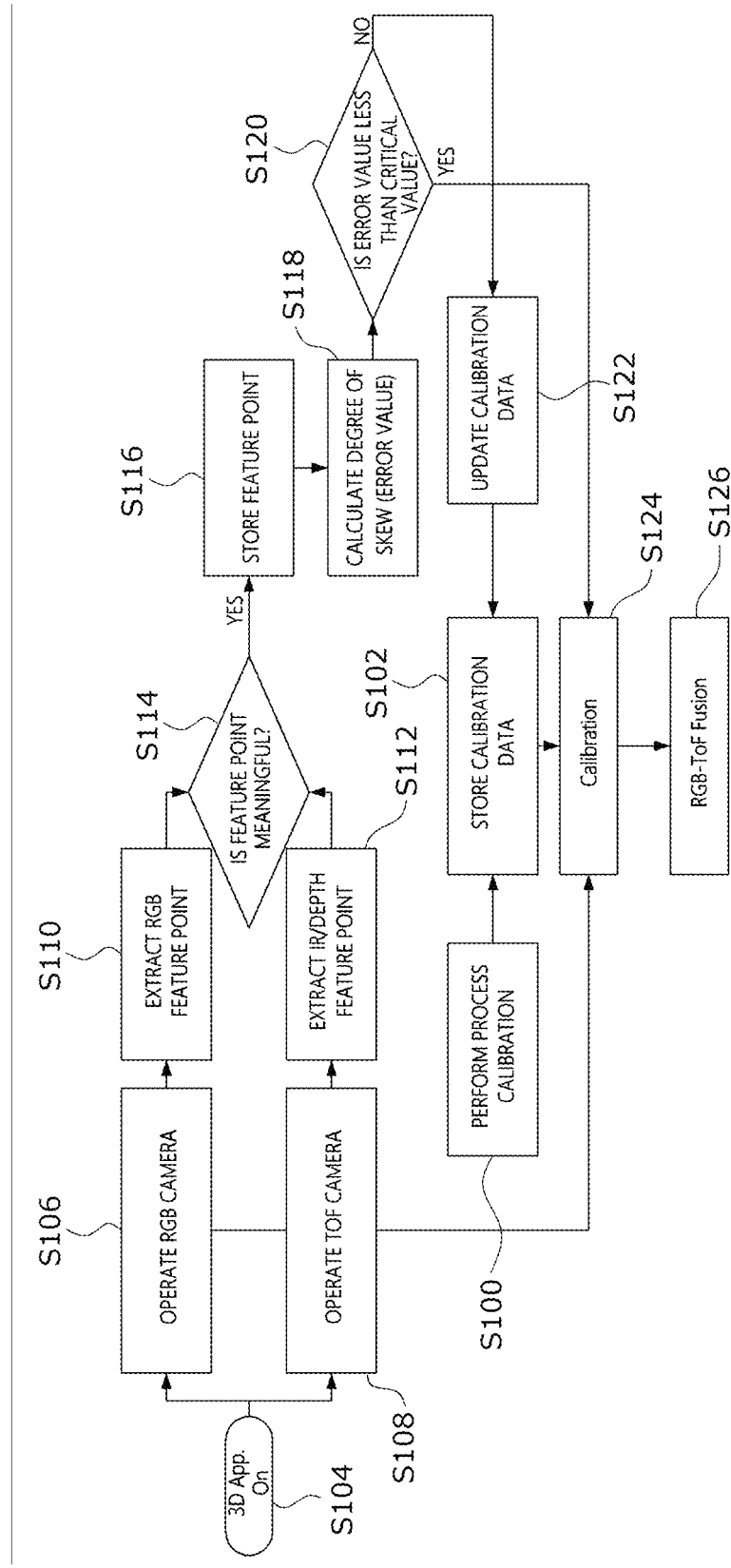

[FIG. 23]
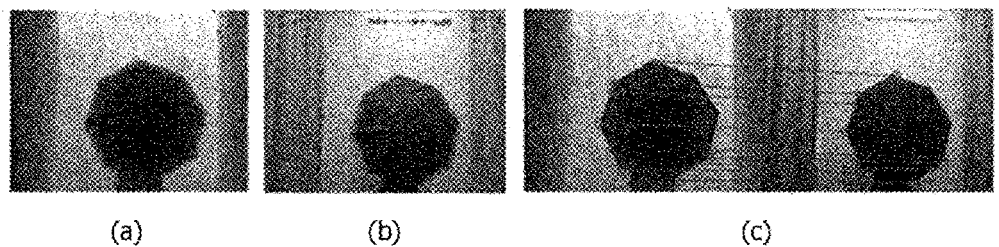
(a)       (b)       (c)
[FIG. 24]
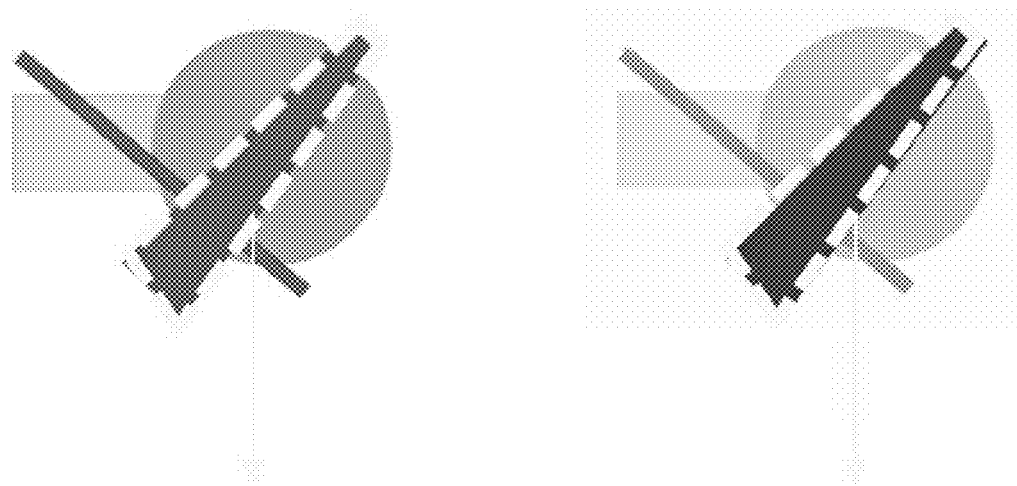
OBJECT IN THE RANGE OF 50 CM TO 52 cm
OBJECT AT 51.5 cm
(a)       (b)

CAMERA APPARATUS AND AUTOFOCUSING METHOD THEREFOR

CROSS REFERENCE TO RELATED APPLICATIONS

This application is the National Phase of PCT International Application No. PCT/KR2020/000998, filed on Jan. 21, 2020, which claims priority under 35 U.S.C. 119(a) to Patent Application No. 10-2019-0008168, filed in the Republic of Korea on Jan. 22, 2019, all of which are hereby expressly incorporated by reference into the present application.

TECHNICAL FIELD

The present invention relates to an autofocusing method of a red-green-blue (RGB) camera.

BACKGROUND ART

As camera modules installed in mobile terminals have been developed, autofocusing functions are needed in the camera modules in the mobile terminals.

Typical examples of autofocusing (AF) include phase AF and contrast AF. The phase AF is performed in a method of dividing incident light into two light rays and comparing intensities and wave patterns and needs a special sensor capable of performing such functions, and thus there is a problem in that a degree of freedom of a sensor is reduced. The contrast AF is performed as a method of measuring while moving a lens forward and rearward using a phenomenon in which a difference in brightness between adjacent pixels increases as the lens is focused, and to this end, a complex software algorithm should be performed, an amount of computation is large, there is a time delay, and battery consumption is large.

Accordingly, a method of performing autofocusing through a simple computation within a short time is required.

Technical Problem

The present invention is directed to providing a method capable of performing autofocusing in a short time.

Technical Solution

One aspect of the present invention provides a method of autofocusing of a camera apparatus, including extracting, by a time of flight (ToF) camera, distance information of an object, and performing autofocusing of a red-green-blue (RGB) camera by using autofocusing information according to the distance information, wherein the ToF camera includes an illumination unit which outputs light to the object and a sensor unit which receives information about the light reflected by the object, the sensor unit receives pieces of information about the light having a plurality of phases reflected by the object based on an output of the light, and the ToF camera extracts the distance information using the pieces of information.

The autofocusing information according to the distance information may include at least one among an actuator control value and a movement distance of a lens for each distance.

The performing of the autofocusing may include substituting the distance information into a correlation of the autofocusing information according to the distance information, extracting the movement distance of the lens from the correlation of the autofocusing information according to the distance information, and moving an autofocusing optical system of the RGB camera by the extracted movement distance of the lens.

The autofocusing information may be calculated using a function consisting of characteristic values of an autofocusing optical system of the RGB camera estimated using pieces of autofocusing calibration data.

The pieces of autofocusing calibration data may include first coordinate values for a distance of the object and the actuator control value, and second coordinate values for the distance of the object and the actuator control value.

The characteristic values of the autofocusing optical system of the RGB camera may include a characteristic value for the lens of the autofocusing optical system of the RGB camera, and a characteristic value for an actuator for moving the lens of the autofocusing optical system of the RGB camera.

The characteristic value for the lens of the autofocusing optical system of the RGB camera may include an effective focal length, and the characteristic value for the actuator for moving the lens of the autofocusing optical system of the RGB camera may include an amount of change in the movement distance of the lens with respect to an amount of change in the actuator control value.

A correlation of the autofocusing information according to the distance information may be prestored in the camera apparatus.

Another aspect of the present invention provides a camera apparatus including an RGB camera which captures an RGB image, a ToF camera which captures a ToF image, and a control unit which performs autofocusing of the RGB camera using distance information of a certain area in the ToF image captured by the ToF camera and a correlation of the autofocusing information according to the distance information of the object.

The autofocusing information according to the distance information of the object may include at least one among an actuator control value and a movement distance of a lens for each distance.

The control unit may substitute the distance information of the certain area into the correlation of the autofocusing information according to the distance information of the object, extract the movement distance of the lens from the correlation of the autofocusing information according to the distance information of the object, and move an autofocusing optical system of the RGB camera by the extracted movement distance of the lens.

The autofocusing information may be calculated using a function consisting of characteristic values of the autofocusing optical system of the RGB camera estimated using pieces of autofocusing calibration data.

The pieces of autofocusing calibration data may include first coordinate values for a distance of an object and an actuator control value and second coordinate values for the distance of the object and the actuator control value.

The characteristic values of the autofocusing optical system of the RGB camera may include a characteristic value for the lens of the autofocusing optical system of the RGB camera and a characteristic value for an actuator for moving the lens of the autofocusing optical system of the RGB camera.

The characteristic value for the lens of the autofocusing optical system of the RGB camera may include an effective focal length of the lens, and the characteristic value for the actuator for moving the lens of the autofocusing optical system of the RGB camera may include an amount of change in the movement distance of the lens with respect to an amount of change in the actuator control value.

The camera apparatus may further include a data storage unit which stores the correlation of the autofocusing information according to the distance information of the object in advance.

Advantageous Effects

According to one embodiment of the present invention, autofocusing of a red-green-blue (RGB) camera can be performed in a short time, and since an amount of computation is small, battery consumption can be reduced. An autofocusing method according to one embodiment of the present invention method can be applied to not only a method of directly moving a lens but also a method of using digital processing.

DESCRIPTION OF DRAWINGS

FIG. 1 is a block diagram illustrating a camera apparatus according to one embodiment of the present invention.

FIG. 2 is a block diagram illustrating a time of flight (ToF) camera according to one embodiment of the present invention.

FIG. 3 is a view for describing a frequency of an output light signal of the ToF camera according to one embodiment of the present invention.

FIG. 4 is a view for describing a process of generating an electric signal according to one embodiment of the present invention.

FIG. 5 is a view for describing an image sensor of the ToF camera according to one embodiment of the present invention.

FIG. 6 is a view showing four phase images obtained by the ToF camera according to one embodiment of the present invention.

FIG. 7 is a view showing a ToF IR image obtained from the phase images of FIG. 6.

FIG. 8 shows views showing depth images obtained from the phase images of FIG. 6.

FIG. 9 shows views illustrating an autofocusing optical system included in a red-green-blue (RGB) camera according to one embodiment of the present invention.

FIG. 10 is a flowchart of an autofocusing method of the camera apparatus according to one embodiment of the present invention.

FIG. 11 is a flowchart of one example of operation S1200 of FIG. 10.

FIG. 12 is one example of a correlation of autofocusing information according to distance information of an object prestored in the camera apparatus according to one embodiment of the present invention.

FIGS. 13A and 13B are examples of autofocused images according to one embodiment of the present invention.

FIG. 14 is a view showing relative positions between an object, an autofocusing lens, and an image sensor.

FIG. 15 is a graph showing a correlation between a position of a lens, a movement distance of the lens, and an actuator control value.

FIG. 16 is a view of one example graph drawn according to a characteristic value of the lens.

FIG. 17 is a view of one example of a correlation matching table obtained from FIG. 16.

FIG. 18 is a block diagram illustrating an image processing unit included in a camera apparatus according to another embodiment of the present invention.

FIGS. 19 and 20 are views for describing a calibration method between a ToF camera and an RGB camera.

FIG. 21 is a view showing a result of mapping a ToF image based on an RGB image.

FIG. 22 is a flowchart showing a method of an image processing method of the camera apparatus according to one embodiment of the present invention.

FIGS. 23 to 24 are views for describing a method of extracting second RGB feature points and second ToF feature points from first RGB feature points and first ToF feature points.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

FIG. 1 is a block diagram illustrating a camera apparatus according to one embodiment of the present invention, FIG.

2 is a block diagram illustrating a time of flight (ToF) camera according to one embodiment of the present invention, FIG. 3 is a view for describing a frequency of an output light signal of the ToF camera according to one embodiment of the present invention, FIG. 4 is a view for describing a process of generating an electric signal according to one embodiment of the present invention is generated, FIG. 5 is a view for describing an image sensor of the ToF camera according to one embodiment of the present invention, FIG. 6 is a view showing four phase images obtained by the ToF camera according to one embodiment of the present invention, FIG. 7 is a view showing a ToF IR image obtained from the phase images of FIG. 6, and FIG. 8 shows views showing depth images from the phase images of FIG. 6.

Referring to FIG. 1, a camera apparatus 10 according to one embodiment of the present invention includes a ToF camera 100, a red-green-blue (RGB) camera 200, and a control unit 300.

The ToF camera 100 is one of apparatuses capable of obtaining depth information, and according to a ToF method, a flight time, that is, a time, in which light is emitted, reflected, and returned, is measured to calculate a distance to an object.

The RGB camera 200 may be a general camera capable of capturing an RBG image.

The ToF camera 100 and the RGB camera 200 may be disposed in one apparatus, for example, one mobile device, to capture an image of the same region.

In addition, the control unit 300 may be connected to the ToF camera 100 and the RGB camera 200 and fuse a ToF image obtained from the ToF camera 100 and an RGB image obtained from the RGB camera 200 so as to obtain a three-dimensional image.

Here, the control unit 300 is illustrated as being disposed adjacent to the ToF camera 100 and the RGB camera 200 in the camera apparatus 10 but is not limited thereto and may be disposed separately from the ToF camera 100 and the RGB camera 200. Alternatively, some functions of the control unit 300 may be included in the ToF camera 100 and the RGB camera 200.

Referring to FIG. 2, the ToF camera 100 includes an illumination unit 110, a lens unit 120, an image sensor unit 130, and an image control unit 140.

The illumination unit 110 generates an output light signal and emits the output light signal to an object. In this case, the illumination unit 110 may generate the output light signal in the form of a pulse wave or continuous wave. The continuous wave may have the form of a sinusoid wave or a squared wave. As the output light signal is generated in the form of the pulse wave or the continuous wave, the ToF camera 100 may detect a phase difference between the output light signal output from the illumination unit 110 and an input light signal which is reflected by an object and input to the ToF camera 100. In the present specification, output light may denote light which is output from the illumination unit 110 and is incident on the object, and input light may denote light which is output from the illumination unit 110, reaches the object, is reflected by the object, and is input to the ToF camera 100. From a viewpoint of the object, the output light may be incident light, and the input light may be reflected light.

The illumination unit 110 emits the generated output light signal to the object for a predetermined integration time. In this case, the integration time means one frame cycle. In a case in which a plurality of frames are generated, the preset integration time is repeated. For example, in a case in which the ToF camera module 100 captures images of an object at 20 FPS, the integration time is ¹/₂₀ [sec]. In addition, in a case in which 100 frames are generated, the integration time may be repeated 100 times.

The illumination unit 110 may generate a plurality of output light signals having different frequencies. The illumination unit 110 may sequentially and repeatedly generate a plurality of output light signals having different frequencies. Alternatively, the illumination unit 110 may also simultaneously generate a plurality of output light signals having different frequencies.

Referring to FIG. 3, the illumination unit 110 may be controlled to generate an output light signal with a frequency $f_1$ for a first half of the integration time and generate an output light signal with a frequency $f_2$ for the remaining half of the integration time.

According to another embodiment, an illumination unit 110 may also control, among a plurality of light emitting diodes (LEDs), some LEDs to generate output light signals with a frequency $f_1$ and control the remaining LEDs to generate output light signals with a frequency $f_2$.

To this end, the illumination unit 110 may include a light source 112 configured to generate light and a light modulator 114 configured to modulate the light.

First, the light source 112 generates light. The light generated by the light source 112 may be infrared light with a wavelength of 770 to 3000 nm and may also be visible light with a wavelength of 380 to 770 nm. LEDs may be used to form the light source 112, and the light source 112 may have a form in which a plurality of LEDs are arrayed in a predetermined pattern. In addition, the light source 112 may also include organic LEDs (OLEDs) or laser diodes (LDs). Alternatively, the light source 112 may also be a vertical cavity surface emitting laser (VCSEL). The VCSEL is one of the LDs configured to convert an electrical signal to a light signal and may use a wavelength of about 800 to 1000 nm, for example, about 850 nm or 940 nm.

The light source 112 is repeatedly turned on and off at predetermined time intervals to generate an output light signal having the form of a pulse wave or continuous wave. The predetermined time interval may be a frequency of the output light signal. The turning on and off of the light source may be controlled by the light modulator 114.

The light modulator 114 controls the turning on and off of the light source 112 to control the light source 112 to generate the output light signal in the form of the continuous wave or pulse wave. The light modulator 114 may control the light source 112 to generate the output light signal in the form of the continuous wave or pulse wave through frequency modulation, pulse modulation, or the like.

Meanwhile, the lens unit 120 collects an input light signal reflected by the object and transmits the input light signal to the image sensor unit 130.

Referring to FIG. 2 again, the image sensor unit 130 generates an electric signal using the input light signal collected through the lens unit 120.

The image sensor unit 130 may be synchronized with a turning on and off cycle of the illumination unit 110 to receive the input light signal. Specifically, the image sensor unit 130 may receive in-phase and out-phase light of the output light signal output from the illumination unit 110. That is, the image sensor unit 130 may repeatedly perform an operation of receiving an incident light signal in a time at which the light source is turned on and an operation of receiving an incident light signal at a time at which the light source is turned off.

Next, the image sensor unit 130 may generate electric signals corresponding to a plurality of reference signals using the reference signals having different phase differences. A frequency of the reference signal may be set to be the same as a frequency of an output light signal output from the illumination unit 110. Accordingly, in a case in which the illumination unit 110 generates output light signals with a plurality of frequencies, the image sensor unit 130 generates electric signals using a plurality of reference signals corresponding to the frequencies. Each of the electric signals may include information about an amount of charge or voltage corresponding to the reference signal.

As shown in FIG. 4, the reference signals according to the embodiment of the present invention may be four reference signals C1 to C4. The reference signals C1 to C4 may have frequencies which are the same as a frequency of the output light signal and have phase differences of 90° between each other. One reference signal C1 among the four reference signals may have a phase which is the same as a phase of the output light signal. A phase of an input light signal is delayed by a distance at which the output light signal is incident on an object and is reflected by and returned from the object. The image sensor unit 130 mixes the input light signal and each of the corresponding reference signals. Then, the image sensor unit 130 may generate an electric signal corresponding to each of shaded regions of the reference signals of FIG. 4.

As another embodiment, in a case in which output light signals having a plurality of frequencies are generated for an integration time, the image sensor unit 130 receives input light signals according to the plurality of frequencies. For example, it is assumed that the output light signals having frequencies $f_1$ and $f_2$ are generated and a plurality of reference signals have phase differences of 90°. Then, since the input light signals also have frequencies $f_1$ and $f_2$, four electric signals may be generated using the input light signal having the frequency $f_1$ and four reference signals corresponding to the input light signal. In addition, four electric signals may be generated using the input light signal having the frequency $f_2$ and the four reference signals corresponding to the input light signal. Accordingly, a total of eight of the electric signals may be generated.

The image sensor unit 130 may be formed in a structure in which a plurality of pixels are arrayed in a grid shape. The image sensor unit 130 may be a complementary metal oxide semiconductor (CMOS) image sensor or may also be a charge coupled device (CCD) image sensor. In addition, the image sensor unit 130 may include a ToF sensor which measures a distance using a time or phase difference by receiving infrared light reflected by an object.

Referring to FIG. 5, for example, in the case of the image sensor 130 with a resolution of 320×240, 76,800 pixels may be arrayed in the grid shape. In this case, constant gaps may be generated between the plurality of pixels like shaded regions of FIG. 3. In the embodiment of the present invention, one pixel with the constant gaps adjacent to one pixel will be described as one pixel.

According to the embodiment of the present invention, each pixel 132 may include a first light receiving unit 132-1 including a first photodiode and a first transistor and a second light receiving unit 132-2 including a second photodiode and a second transistor.

The first light receiving unit 132-1 receives an input light signal having a phase which is the same as that of a waveform of an output light signal. That is, when the light source is turned on, the first photodiode is turned on and receives the input light signal. In addition, when the light source is turned off, the first photodiode is turned off and stops the reception of the input light signal. The first photodiode converts the received input light signal to a current and transmits the current to the first transistor. The first transistor converts the received current to an electric signal and outputs the electric signal.

The second light receiving unit 132-2 receives the input light signal having a phase opposite to that of the waveform of the output light. That is, when the light source is turned on, the second photodiode is turned off and receives the input light signal. In addition, when the light source is turned off, the second photodiode is turned on and stops the reception of the input light signal. The second photodiode converts the received input light signal to a current and transmits the current to the second transistor. The second transistor converts the received current to an electric signal.

Accordingly, the first light receiving unit 132-1 may be referred to as an in-phase receiving unit, and the second light receiving unit 132-2 may be referred to as an out-phase receiving unit. As described above, when the first light receiving unit 132-1 and the second light receiving unit 132-2 are activated at different times, a difference in amount of received light occurs according to a distance from the object. For example, in a case in which the object is located on the front of the ToF camera 100 (that is, distance=0), since a time taken for light to be output from the illumination unit 110 and reflected by and returned from the object is zero, a turning on and off cycle of the light source is a light receiving cycle. Accordingly, only the first light receiving unit 132-1 receives the light, and the second light receiving unit 132-2 does not receive light. As another example, in a case in which the object is spaced apart from the ToF camera 100 by a certain distance, since it takes time for light to be output from the illumination unit 110 and reflected by and returned from the object, a turning on and off cycle of the light source is different from a light receiving cycle. Accordingly, a difference in amount of received light occurs between the first light receiving unit 132-1 and the second light receiving unit 132-2. That is, a distance of the object may be calculated using the difference in amount of received light between the first light receiving unit 132-1 and the second light receiving unit 132-2.

Referring to FIG. 2 again, the image control unit 140 calculates a phase difference between the output light and the input light using the electric signals received from the image sensor unit 130 and calculates a distance between the object and the ToF camera 100 using the phase difference.

Specifically, the image control unit 140 may calculate a phase difference between the output light and the input light using information about an amount of charge of the electric signal.

As described above, four electric signals may be generated for a frequency of the output light signal. Accordingly, the image control unit 140 may calculate a phase difference $t_d$ between the output light signal and the input light signal using Equation 1 below.

$$t_d = \arctan\left(\frac{Q_3 - Q_4}{Q_1 - Q_2}\right) \quad \text{[Equation 1]}$$

Here, Q1 to Q4 denote amounts of charges of four electrical signals. Q1 denotes the amount of charge of the electrical signal corresponding to a reference signal having a phase which is the same as a phase of the output light signal. Q2 denotes the amount of charge of the electrical signal corresponding to a reference signal having a phase delayed by 180° from the phase of the output light signal. Q3 denotes the amount of charge of the electrical signal corresponding to a reference signal having a phase delayed by 90° from the phase of the output light signal. Q4 denotes the amount of charge of the electrical signal corresponding to a reference signal having a phase delayed by 270° from the phase of the output light signal.

Then, the image control unit 140 may calculate a distance between the object and the ToF camera 100 using the phase difference between the output light signal and the input light signal. In this case, the image control unit 140 may calculate a distance d between the object and the ToF camera 100 using the Equation 2 below.

$$d = \frac{c}{2f} \frac{t_d}{2\pi}$$ [Equation 2]

Here, c denotes a light speed, and f denotes a frequency of the output light.

According to the embodiment of the present invention, a ToF infrared (IR) image and a depth image may be obtained from the ToF camera 100. In the present specification, the ToF image may be the ToF IR image or depth image.

More specifically, as illustrated in FIG. 6, raw images according to the four phases may be obtained from the ToF camera 100 according to the embodiment of the present invention 100. In this case, the four phases may be a phase 0°, a phase 90°, a phase 180°, and a phase 270°, and the raw image for each of the phases may be an image including pixel values digitized for each of the phases and may also be referred to as a phase image, a phase IR image, or the like.

When calculation is performed using the four phase images of FIG. 6 and Equation 3, an amplitude image which is a ToF IR image of FIG. 7 may be obtained.

Amplitude = [Equation 3]

$$\frac{1}{2}\sqrt{(\mathrm{Raw}(x_{90}) - \mathrm{Raw}(x_{270}))^2 + (\mathrm{Raw}(x_{180}) - \mathrm{Raw}(x_0))^2}$$

Here, Raw(x0) may be a data value, which is received by a sensor at the phase 0°, for each pixel, Raw(×90) may be a data value, which is received by the sensor at the phase 90°, for each pixel, Raw(×180) may be a data value, which is received by the sensor at the phase 180°, for each pixel, and Raw(×270) may be a data value, which is received by the sensor at the phase 270°, for each pixel.

Alternatively, when calculation is performed using four phase images of FIG. 6 and Equation 4, an intensity image which is another ToF IR image may also be obtained.

Intensity=|Raw($x_{90}$)−Raw($x_{270}$)|+|Raw(×$_{180}$)−Raw($x_0$)| [Equation 4]

In this case, Raw(x0) may be a data value, which is received by the sensor at the phase 0°, for each pixel, Raw(×90) may be a data value, which is received by the sensor at the phase 90°, for each pixel, Raw(×180) may be a data value, which is received by the sensor at the phase 180°, for each pixel, and Raw(×270) may be a data value, which is received by the sensor at the phase 270°, for each pixel.

As described above, the ToF IR image is an image generated through an operation of subtracting two phase images among four phase images from the remaining two phase images, and background light may be removed through the operation. Accordingly, in the ToF IR image, only a signal with a wavelength output by the light source remains so that IR sensitivity to the object can be increased and noise can be significantly reduced.

In the present specification, the ToF IR image may be the amplitude image or intensity image, and the intensity image may also be referred to as a confidence image. As illustrated in FIG. 7, the ToF IR image may be a grey image.

Meanwhile, when calculation is performed using four phase images of FIG. 6 and Equations 5 and 6, a depth image of FIG. 8 may also be obtained.

$$\mathrm{Phase} = \arctan\left(\frac{\mathrm{Raw}(x_{90}) - \mathrm{Raw}(x_{270})}{\mathrm{Raw}(x_{180}) - \mathrm{Raw}(x_0)}\right)$$ [Equation 5]

$$\mathrm{Depth} = \frac{1}{2f} c \frac{\mathrm{Phase}}{2\pi} (c = \mathrm{speed\ of\ light})$$ [Equation 6]

FIG. 9 shows views illustrating an autofocusing optical system included in the RGB camera according to one embodiment of the present invention.

FIG. 9A is a view illustrating the autofocusing optical system in a tele mode, FIG. 9B is a view illustrating the autofocusing optical system in a wide mode, and FIG. 9C is a view illustrating the autofocusing optical system in a superwide mode.

Referring to FIGS. 9A to 9C, an autofocusing optical system 900 is disposed between an object 910 and an image sensor 920. Although not illustrated in the drawing, the autofocusing optical system 900 may include a plurality of lenses.

The autofocusing optical system 900 may move to adjust a magnification according to a distance of the object 910 and focus on the image sensor 920.

For example, as illustrated in FIGS. 9A to 9C, the lens of the autofocusing optical system 900 may be moved so that an effective focal length $f_{EFL}$ is decreased as the distance of the object becomes short, that is, the tele mode is changed to the superwide mode.

As described above, a distance, by which the lens of the autofocusing optical system 900 is moved, may be changed according to the distance of the object.

According to the embodiment of the present invention, distance information of a certain area in a ToF image captured by the ToF camera is extracted from the ToF image, and autofocusing of the RGB camera is performed using the distance information.

FIG. 10 is a flowchart of an autofocusing method of the camera apparatus according to one embodiment of the present invention.

Referring to FIG. 10, the camera apparatus 10 captures a ToF image using the ToF camera 100 (S1000) and extracts distance information of a certain area in the ToF image (S1100). In this case, the certain area in the ToF image may be an area to be focused on, and the area to be focused on may be directly set by a user or set by an object detection algorithm embedded in the control unit 300. The object detection algorithm may be an algorithm to detect a specific object in an image, for example, the biggest object or person. To this end, as described above, the sensor unit of the ToF camera 100 may receive pieces of information about light having a plurality of phases reflected by the object based on an output of the light and extract distance information of the object using the pieces of information.

Next, the control unit 300 of the camera apparatus 10 performs autofocusing of the RGB camera 200 using a correlation between the distance information of the certain area in the ToF image extracted in operation S1100 and autofocusing information according to the distance information of the object (S1200).

FIG. 11 is a flowchart of one example of operation S1200 of FIG. 10.

Referring to FIG. 11, the control unit 300 of the camera apparatus 10 substitutes the distance information of the certain area in the ToF image extracted in operation S1100 into the correlation of the autofocusing information according to the distance information of the object (S1210), extracts a movement distance of the lens from the correlation of the autofocusing information according to the distance information of the object (S1220), and moves the autofocusing optical system of the RGB camera 200 by the extracted movement distance of the lens (S1230).

In this case, the correlation of the autofocusing information according to the distance information of the object may be stored in the camera apparatus 10 and include at least one among an actuator control value and the movement distance of the lens for each distance.

FIG. 12 is one example of the correlation of the autofocusing information according to the distance information of the object prestored in the camera apparatus according to one embodiment of the present invention, and FIGS. 13A and 13B are examples of autofocused images according to one embodiment of the present invention.

Referring to FIG. 12, the distance (mm) of the object or a depth (mm) which matches at least one of the actuator control value (resolution cal. (DAC)) and the lens movement distance may be stored. To this end, the camera apparatus 10 may further include a data storage unit.

The camera apparatus 10 according to the embodiment of the present invention may extract the distance or the depth of the object from the ToF image and perform autofocusing using the actuator control value or lens movement distance matched with the extracted distance or depth of the object.

In this case, the actuator control value may include a voltage or current applied to the actuator for moving the lens. The actuator for moving the lens may be, for example, a voice coil motor (VCM).

As illustrated in FIG. 13A, in a case in which 250 mm is extracted as a distance of an object to be focused on from a ToF image, autofocusing may be performed in a process of moving the lens by 0.03993 mm using an actuator control value of 426.565997 DAC matched therewith. Alternatively, in the case in which 250 mm is extracted as the distance of the object to be focused on from the ToF image, autofocusing may also be performed in a process of moving the lens by 0.03993 mm which is the lens movement distance matched therewith.

Alternatively, as illustrated in FIG. 13B, in a case in which 600 mm is extracted as a distance of an object to be focused on from a ToF image, autofocusing may be performed in a process of moving the lens by 0.01652 mm using an actuator control value of 323.027365 DAC matched therewith. Alternatively, in the case in which 600 mm is extracted as the distance of the object to be focused on from the ToF image, autofocusing may also be performed in a process of moving the lens by 0.01652 mm which is the lens movement distance matched therewith.

Accordingly, since a lens movement distance for an object to be focused on can be extracted using only a distance of the object extracted from a ToF image, autofocusing can be performed in a short time without performing a complex operation.

Meanwhile, the correlation of the autofocusing information according to the distance information of the object may be estimated by a function consisting of characteristic values of the autofocusing optical system of the RGB camera 200. The characteristic values of the autofocusing optical system of the RGB camera 200 may differ according to a kind, a structure, and the like of an optical system. Hereinafter, a method of estimating the correlation of the autofocusing information according to the distance information of the object will be described more specifically.

FIG. 14 is a view showing relative positions between an object, an autofocusing lens, and an image sensor, and FIG. 15 is a graph showing a correlation between a position of a lens, a movement distance of the lens, and an actuator control value.

Referring to FIG. 14 and Equation 7, the lens may be expressed as the following function.

$$\frac{1}{x} + \frac{1}{q} = \frac{1}{f_{EFL}}$$ [Equation 7]

Here, x denotes a distance between an autofocusing lens 1400 and an object 1410, q denotes a position (mm) of the lens 1400 to an image sensor 1420, and $f_{EFL}$ denotes a focal length (mm). As illustrated in FIG. 9, since the focal length is changed according to the tele mode, the wide mode, and the superwide mode, the lens 1400 may be moved to form an image on the image sensor 1420.

Meanwhile, referring to FIG. 15 and Equation 8, a correlation between a position of a lens, a lens movement distance, and an actuator control value may be expressed as the following function.

$$q(y) = ay + b$$ [Equation 8]

In this case, q denotes a position (mm) of the lens 1400 from the image sensor 1420, y denotes an actuator control value, a denotes a slope (mm/DAC) of a lens movement distance to an amount of change in the actuator control value, and b denotes an intercept (mm).

In a case in which Equation 8 is substituted into Equation 7, Equation 9 and Equation 10 can be sequentially derived.

$$\frac{1}{x} + \frac{1}{ay+b} = \frac{1}{f_{EFL}}$$ [Equation 9]

$$y = \left(\frac{1}{\frac{1}{f_{EFL}} - \frac{1}{x}} - b\right) \Big/ a$$ [Equation 10]

In this case, a characteristic value of the autofocusing optical system of the RGB camera 200 may include a characteristic value for a lens and a characteristic value for an actuator for moving the lens. The characteristic value for the lens may include an effective focal length $f_{EFL}$ of the lens, and the characteristic value for the actuator for moving the lens may include change a of the movement distance of the lens with respect to an amount of a change in an actuator control value and an intercept b.

When the effective focal length $f_{EFL}$ of the lens, the change a of the movement distance of the lens with respect to the amount of change in the actuator control value, and the intercept b are derived, a function consisting of a characteristic value of the autofocusing optical system of the RGB camera 200 may be estimated as in Equation 10. In addition, when a distance of an object extracted from a ToF image is substituted for x of Equation 10, y (DAC) which is an actuator control value may be derived.

In this case, the function consisting of the characteristic value of the autofocusing optical system of the RGB camera 200 may be estimated using pieces of autofocusing calibration data. The pieces of autofocusing calibration data may include a plurality of coordinate values for a distance of an object and an actuator control value. For example, N pieces of the autofocusing calibration data may be expressed as follows.

$$x = \{(x_1, y_1), (x_2, y_2), \ldots, (x_n, y_n), \ldots, (x_N, y_N)\} \quad \text{[Equation 11]}$$

In a case in which two pairs of coordinate values for a distance of an object and an actuator control value are given, characteristic values $f_{EFL}$, a, and b for the actuator for moving the lens may be estimated as follows.

$$y_1 = \left(\frac{1}{\frac{1}{f_{EFL}} - \frac{1}{x_1}} - b\right) \Big/ a \quad \text{[Equation 12]}$$

$$y_2 = \left(\frac{1}{\frac{1}{f_{EFL}} - \frac{1}{x_2}} - b\right) \Big/ a$$

In a case in which three pairs of coordinate values for a distance of an object and an actuator control value are given, characteristic values $f_{EFL}$, a, and b for the actuator for moving the lens may be estimated as follows.

$$y_1 = \left(\frac{1}{\frac{1}{f_{EFL}} - \frac{1}{x_1}} - b\right) \Big/ a \quad \text{[Equation 13]}$$

$$y_2 = \left(\frac{1}{\frac{1}{f_{EFL}} - \frac{1}{x_2}} - b\right) \Big/ a$$

$$y_3 = \left(\frac{1}{\frac{1}{f_{EFL}} - \frac{1}{x_3}} - b\right) \Big/ a$$

In a case in which four pairs of coordinate values of a distance of an object and an actuator control value are given, characteristic values $f_{EFL}$, a, and b for the actuator for moving the lens may be estimated as follows.

$$y_1 = \left(\frac{1}{\frac{1}{f_{EFL}} - \frac{1}{x_1}} - b\right) \Big/ a \quad \text{[Equation 14]}$$

$$y_2 = \left(\frac{1}{\frac{1}{f_{EFL}} - \frac{1}{x_2}} - b\right) \Big/ a$$

$$y_3 = \left(\frac{1}{\frac{1}{f_{EFL}} - \frac{1}{x_3}} - b\right) \Big/ a$$

$$y_4 = \left(\frac{1}{\frac{1}{f_{EFL}} - \frac{1}{x_4}} - b\right) \Big/ a$$

In the case in which the characteristic values $f_{EFL}$, a, and b for the actuator for moving the lens are estimated as described above, a graph illustrated as in FIG. 16 may be obtained, an actuator control value $\dot{y}$ corresponding to a distance $\dot{x}$ of an arbitrary object may be estimated, and a correlation matching table may be obtained as in FIG. 17.

According to the embodiment of the present invention, autofocusing of the RGB camera can be rapidly performed without a complex operation process as described above.

Meanwhile, according to another embodiment of the present invention, in a case in which matching quality of a ToF image obtained from the ToF camera and an RGB image obtained from the RGB camera is high, precision of autofocusing may be high. To this end, the camera apparatus according to the embodiment of the present invention may further include an image processing unit which calibrates the ToF image obtained from the ToF camera and the RGB image obtained from the RGB camera, and the image processing unit may be implemented in the control unit of FIG. 1 or implemented separately from the control unit.

FIG. 18 is a block diagram illustrating an image processing unit included in a camera apparatus according to another embodiment of the present invention.

Referring to FIG. 18, an image processing unit 1300 includes an image obtaining unit 1310 which receives a ToF image and an RGB image from a ToF camera 100 and an RGB camera 200, respectively, a first feature point extraction unit 1320 which extracts first RGB feature points from the RGB image and first ToF feature points from the ToF image, a second feature point extraction unit 1330 which extracts second RGB feature points and second ToF feature points from the first RGB feature point and the first ToF feature point, respectively, a calibration unit 1340 which calibrates the RGB image and the ToF image using the second RGB feature points and the second ToF feature points, respectively, and an image fusion unit 1350 which generates a three-dimensional color image by matching the calibrated RGB image with the ToF image. The image processing unit 1300 according to the embodiment of the present invention may further include a signal receiving unit 1360 which receives a signal for triggering operations of the first feature point extraction unit 1320, the second feature point extraction unit 1330, and the calibration unit 1340, and a distance information obtaining unit 1370 which obtains distance information of an object from the ToF camera 100 or the RGB camera 200.

As described above, the TOF image obtained from the ToF camera 100 may include a ToF IR image and a depth image. In this case, the ToF IR image may be an amplitude image or intensity image generated from IR images in four phases 0°, 90°, 180°, and 270°. The amplitude image may be generated according to the descriptions of FIGS. 6 to 7 and Equations 3 and 4. The image fusion unit 1350 may generate a three-dimensional color image including both of color information and depth information by matching and rendering the RGB image with the depth image.

Meanwhile, in order for the image fusion unit 1350 to obtain a high-quality three-dimensional color image by matching the depth image from the ToF camera 100 and the RGB image obtained from the RGB camera 200, precise alignment between the ToF camera 100 and RGB 200 is required. In a case in which the ToF camera 100 and the RGB camera 200 are installed in one apparatus, for example, one mobile device, calibration between the ToF camera 100 and the RGB camera 200 should be performed in advance after the mobile device is assembled and before being sold in the market.

FIGS. 19 and 20 are views for describing a calibration method between the ToF camera and the RGB camera.

Referring to FIGS. 19 and 20, a chart having a predetermined pattern is disposed in front of the ToF camera 100 and the RGB camera 200, and the ToF camera 100 and the RGB camera 200 capture images of the same chart and obtain pattern images.

Each of the cameras may extract parameters in the camera, that is, between a lens and a sensor through intrinsic calibration from the pattern image.

In this case, the extracted parameters may be a focal length, an optical center, and distortion correction coefficients.

In addition, each of the cameras may extract parameters between the camera and the chart through extrinsic calibration from the pattern image. The parameters between the camera and the chart of the ToF camera may be described using extrinsic parameters X, Y, and Z/Pitch/Roll/Yaw and a reprojection error, and the parameters between the camera and the chart of the RGB camera may be described using extrinsic parameters X, Y, and Z/Pitch/Roll/Yaw and a reprojection error.

In addition, extrinsic calibration between two cameras may be performed using the parameters extracted through the intrinsic calibration of the cameras and the parameters extracted through the extrinsic calibration of the cameras, and parameters for a position correlation between two cameras may be extracted. In this case, the parameters for the position correlation between the cameras may be described using X, Y, and Z/Pitch/Roll/Yaw and a reprojection error. For example, a result of mapping the ToF image based on the RGB image may be shown in Table 1 below, and the result may be shown as in FIG. 21.

TABLE 1

| Param | TOF | RGB | RGB-based TOF mapping |
|---|---|---|---|
| Pitch (°) | 90.9761 | 86.5407 | 4.37048 |
| Roll (°) | 0.42211 | 0.92037 | −0.23463 |
| Yaw (°) | −1.5376 | 3.40775 | −5.00505 |
| X (mm) | −6.2585 | 24.0698 | −29.9763 |
| Y (mm) | 130.25 | 133.406 | 2.33581 |
| Z (mm) | −358.023 | −352.497 | −7.49864 |
| ReprojectionError (pixels) | 0.1543 | 1.0719 | 4.5120 |

In the embodiment of the present invention, it may be assumed that the ToF camera 100 and the RGB camera 200 are assembled in one apparatus before being sold in the market, for example, even in a manufacturing operation, the calibration is performed in advance using the method illustrated in FIGS. 19 to 20, and the calibration data including the X, Y, and Z/Pitch/Roll/Yaw and the reprojection error are prestored. In the present specification, an example in which the calibration data is prestored in the image processing unit 1300 is described, but the present invention is not limited thereto, the calibration data may also be prestored in the apparatus in which the camera apparatus 10 according to the embodiment of the present invention is installed, for example, a mobile device or a remote storage unit. According to the embodiment of the present invention, the image processing unit 1300 may perform the calibration between the ToF camera 100 and the RGB camera 200 in real time. Accordingly, even when skew occurs between the ToF camera 100 and the RGB camera 200, a high-quality three-dimensional color image can be obtained without visiting a service center whenever the skew occurs.

For the sake of convenience of description, in the present specification, calibration performed after the ToF camera and the RGB camera are assembled and before being sold in the market may be referred as off-line calibration or process calibration, and calibration performed in the image processing unit 1300 in real time may be referred to as real time calibration, dynamic calibration, and the like. For the sake of convenience of description, an example in which the camera apparatus of the present invention is installed in a mobile device is described, but the present invention is not limited thereto, and the embodiment of the present invention can be applied to any device in which both of an RGB camera and a ToF camera are installed to compose a three-dimensional color image.

FIG. 22 is a flowchart showing a method of an image processing method of a camera apparatus according to one embodiment of the present invention.

Referring to FIG. 22, as described above, before a product is sold in the market, off-line calibration between the ToF camera 100 and the RGB camera 200 is performed in advance (S100), and calibration data may be prestored in the image processing unit 1300 (S102). In this case, the calibration data may include X, Y, and Z/Pitch/Roll/Yaw and a reprojection error.

When an application related to a three-dimensional image is driven in a mobile device (S104), both of the RGB camera 200 and the ToF camera 100 start to operate, and the image obtaining unit 1310 of the image processing unit 1300 obtains an RGB image and a ToF image (S106 and S108). In this case, the ToF image may include a ToF IR image and a depth image generated from IR images in four phases as described above.

Next, the first feature point extraction unit 1320 of the image processing unit 1300 extracts first RGB feature points from the RGB image (S110) and extracts first ToF feature points from the ToF image (S112). In this case, the first RGB feature points may be extracted using at least one piece among edge information, shape information, size information, and center point information of an object in the RGB image, and the first ToF feature points may be extracted using at least one piece among edge information, shape information, size information, and center point information of an object in the ToF image. In this case, the first ToF feature points may include at least one of feature points extracted from the ToF IR image and feature points extracted from the depth image. In operations S110 and S112, one of various known methods of extracting feature points from an image may be applied.

Next, the second feature point extraction unit 1320 of the image processing unit 1300 matches the first RGB feature points with the first ToF feature points to extract second RGB feature points and second ToF feature points in which a correlation between the first RGB feature point and the first ToF feature point is a predetermined value or more (S114). In this case, since the fact that the correlation between the first RGB feature point and the first ToF feature point is the predetermined value or more denotes that the feature point may be extracted from both of the RGB image and the ToF image, when comparing the feature points, a degree of skew between the RGB camera 200 and the ToF camera 100 may be inferred. Accordingly, in the present specification, the second RGB feature points and the second ToF feature points may also be referred to as meaningful feature points. In this case, the second RGB feature points and the second ToF feature points may be extracted by matching the first RGB feature points with the first ToF feature points of the ToF IR image, matching the first RGB feature points with the first ToF feature points of the depth image, or matching the first RGB feature points with the first ToF feature points of the ToF IR image and the first ToF feature points of the depth image. In this case, the ToF IR image is advantageous for extracting edge components of an object as feature points, and the depth image is advantageous for distinguishing objects using feature points in a case in which the objects having the same material and color exist at different distances.

In operation S114, one of known methods of matching feature points between an RGB image and a ToF image, for example, a scale invariant feature transform (SIFT) algorithm or speeded up robust feature (SURF) algorithm may be applied. FIG. 23 shows views for describing a method of extracting the second RGB feature points and the second ToF feature points from the first RGB feature points and the first ToF feature points. When matching is performed between feature points of a depth image expressed in a red color in FIG. 23A and feature points of an RGB image expressed in a red color in FIG. 23B using the SIFT algorithm, the SURF algorithm, or the like, second RGB feature points and second ToF feature points between which a correlation is a predetermined value or more may be extracted as in FIG. 23C.

Next, the image processing unit 1300 stores information about the second RGB feature points and the second ToF feature points extracted by the second feature point extraction unit 1320 (S116), and the calibration unit 1340 calculates error values between the second RGB feature points and the second ToF feature points (S118). In this case, the error value may be calculated using at least one among an X value, a Y value, a Z value, a pitch value, a roll value, a yaw value, and a reprojection error of the second RGB feature point and at least one among an X value, a Y value, a Z value, a pitch value, a roll value, a yaw value, and a reprojection error of the second ToF feature point. The error value may be a degree of skew between the RGB image and the ToF image and may include at least one of the X value, the Y value, the Z value, the pitch value, the roll value, the yaw value, and the reprojection error.

In addition, the calibration unit 1340 of the image processing unit 1300 compares the error value in operation S118 with a critical value (S120), updates the error value with new calibration data when the error value is greater than the critical value (S122), and calibrates the RGB image and the ToF image using the calibration data (S124).

In addition, the image fusion unit 1350 of the image processing unit 1300 generates a three-dimensional color image by matching the calibrated RGB image and ToF image (S126).

According to the embodiment of the present invention, even when skew occurs due to various reasons when an apparatus, in which the ToF camera 100 and the RGB camera 200 are installed, is used, the calibration can be automatically performed in real time without visiting a service center as described above.

Meanwhile, in a case in which the RGB camera and the ToF camera can capture an image of an object located at a long distance, images of objects, which are present at long distances, may have been captured in the RGB image and the ToF image, and thus the numbers of first RGB feature points and first ToF feature points may increase infinitely, and accuracy may decrease.

Accordingly, according to one embodiment of the present invention, in order to extract the second RGB feature points and the second ToF feature points in operation S114, distance information may also be further used. For example, the second RGB feature points and the second ToF feature points may be extracted by comparing only a correlation of the feature points within a predetermined distance, for example, 1 m, from the camera among the first RGB feature points and the first ToF feature points. Accordingly, not only accuracy of the meaningful feature points is improved but also an amount of computation for calculating the correlation between the first RGB feature point and the first ToF feature point can be significantly reduced.

To this end, the distance information may be obtained from the distance information obtaining unit 1370 of the image processing unit 1300. In this case, the distance information obtaining unit 1370 may be connected to the ToF camera 100 to obtain the distance information of the object from the ToF camera 100 in the depth image. Alternatively, the distance information obtaining unit 1370 may also be connected to the image obtaining unit 1310 of the image processing unit 1300 to directly extract the distance of the object from the depth image received from the image obtaining unit 1310.

In addition, in a case in which there are many similar patterns or forms within an image capturing range of the RGB camera and the ToF camera, it may be difficult to ensure that one of first RGB feature points of an RGB image and one of first ToF feature points of a ToF image are the same object. Accordingly, according to one embodiment of the present invention, first RGB feature points of only an object of which a distance from the camera is within a predetermined range in an RGB image may be extracted as illustrated in FIG. 24A, first ToF feature points of only an object of which a distance from the camera is the same as or similar to the predetermined range may be extracted as illustrated in FIG. 24B, and second RGB feature points and second ToF feature points may be extracted using a correlation between the first RGB feature point and the first ToF feature point. Alternatively, second RGB feature points and second ToF feature points may also be extracted by extracting first RGB feature points and first ToF feature points from an entire range of an RGB image and an entire range of a ToF image, respectively, and using a correlation between the first RGB feature point of which a distance from the camera is within a predetermined range in the RGB image and the first ToF feature point of which a distance from the camera is within the predetermined range in the ToF image among the extracted first RGB feature points and first ToF feature points. Accordingly, an amount of computation can be significantly reduced, and accuracy of meaningful feature points can be improved.

As described above, when meaningful feature points of only an object within a predetermined distance or range are extracted, not only accuracy of the meaningful feature points can be improved but also an amount of computation can be significantly reduced.

Although not illustrated in the drawings, in another embodiment of the present invention, in operation S118 of calculating the error value between the second RGB feature points and the second ToF feature points, a drop impact detection signal may be further used. The image processing unit 1300 may perform S118 of calculating the error value between the second RGB feature points and the second ToF feature points only when receiving the drop impact detection signal.

While the present invention has been mainly described above with reference to the embodiments, it will be understood by those skilled in the art that the invention is not limited to the embodiments, the embodiments are only examples, and various modifications and applications which are not illustrated above may fall within the range of the present invention without departing from the essential features of the present embodiments. For example, components specifically described in the embodiments may be modified and implemented. In addition, it should be interpreted that differences related to modifications and applications fall within the scope of the present invention defined by the appended claims.

The invention claimed is:

1. A method of autofocusing of a camera apparatus, comprising:
   extracting, by a time of flight (ToF) camera, distance information of an object; and
   performing autofocusing of a red-green-blue (RGB) camera by using autofocusing information according to the distance information and the distance information of the object,
   wherein the ToF camera includes an illumination unit which outputs light to the object and a sensor unit which receives information about the light reflected by the object,
   wherein the sensor unit receives pieces of information about the light having a plurality of phases reflected by the object based on an output of the light,
   wherein the ToF camera extracts the distance information using the pieces of information, and
   wherein the autofocusing information is calculated using a function consisting of characteristic values, which are estimated using a plurality of pieces of autofocusing calibration data, of an autofocusing optical system of the RGB camera.

2. The method of claim 1, wherein the autofocusing information includes at least one among an actuator control value and a movement distance of a lens for each distance.

3. The method of claim 1, wherein the performing of the autofocusing includes:
   substituting the distance information of the object into the autofocusing information according to the distance information;
   extracting a movement distance of the lens from the autofocusing information according to the distance information; and
   moving the autofocusing optical system of the RGB camera by the extracted movement distance of the lens.

4. The method of claim 1, wherein the plurality of pieces of autofocusing calibration data include:
   first coordinate values for a distance of the object and the actuator control value; and
   second coordinate values for the distance of the object and the actuator control value.

5. The method of claim 1, wherein the characteristic values of the autofocusing optical system of the RGB camera include:
   a characteristic value for the lens of the autofocusing optical system of the RGB camera; and
   a characteristic value for an actuator for moving the lens of the autofocusing optical system of the RGB camera.

6. The method of claim 5, wherein:
   the characteristic value for the lens of the autofocusing optical system of the RGB camera includes an effective focal length of the lens; and
   the characteristic value for the actuator for moving the lens of the autofocusing optical system of the RGB camera includes an amount of change in the movement distance of the lens with respect to an amount of change in the actuator control value.

7. The method of claim 1, wherein the function includes at least one among an actuator control value of the RGB camera, an amount of change in a movement distance of a lens with respect to an amount of change in the actuator control value, and an intercept.

8. The method of claim 7, wherein the function is expressed as in an equation below:

$$y = \left( \frac{1}{\frac{1}{f_{EFL}} - \frac{1}{x}} - b \right) \bigg/ a,$$

wherein y denotes the actuator control value of the RGB camera, $f_{EFL}$ denotes a focal length of the RGB camera, x denotes a distance between an autofocusing lens of the RGB camera and the object, a denotes the amount of change in the movement distance of the lens with respect to the amount of change in the actuator control value, and b denotes the intercept.

9. The method of claim 7, wherein the autofocusing information is generated through a focal length of the RGB camera estimated using the plurality of pieces of autofocusing calibration data and the function, the amount of change in the movement distance of the lens with respect to the amount of change in the actuator control value, and the actuator control value corresponding to a distance of an arbitrary object calculated on the basis of the intercept.

10. The method of claim 1, wherein the autofocusing information according to the distance information is pre-stored in the camera apparatus.

11. A camera apparatus comprising:
    a time of flight (ToF) camera which extracts distance information of an object;
    a red-green-blue (RGB) camera; and
    a control unit which performs autofocusing of the RGB camera using autofocusing information according to the distance information and the distance information of the object,
    wherein the ToF camera includes an illumination unit which outputs light to the object and a sensor unit which receives information about the light reflected by the object,
    wherein the sensor unit receives a plurality of pieces of information about the light reflected by the object at a plurality of phases on the basis of the output of the light,
    wherein the ToF camera extracts the distance information using the plurality of pieces of information, and
    wherein the autofocusing information is calculated using a function consisting of characteristic values, which are estimated using the plurality of pieces of autofocusing calibration data, of an autofocusing optical system of the RGB camera.

12. The camera apparatus of claim 11, wherein the autofocusing information includes at least one of an actuator control value and a movement distance of a lens for each distance.

13. The camera apparatus of claim 11, wherein the control unit:
    substitutes the distance information of the object into the autofocusing information according to the distance information;
    extracts a movement distance of the lens from the autofocusing information according to the distance information; and
    moves the autofocusing optical system of the RGB camera by the extracted movement distance of the lens.

14. The camera apparatus of claim 11, wherein the plurality of pieces of autofocusing calibration data include:
   first coordinate values for a distance of the object and the actuator control value; and
   second coordinate values for the distance of the object and the actuator control value.

15. The camera apparatus of claim 11, wherein the characteristic values of the autofocusing optical system of the RGB camera include:
   a characteristic value for the lens of the autofocusing optical system of the RGB camera; and
   a characteristic value for an actuator for moving the lens of the autofocusing optical system of the RGB camera.

16. The camera apparatus of claim 15, wherein:
   the characteristic value for the lens of the autofocusing optical system of the RGB camera includes an effective focal length of the lens; and
   the characteristic value for the actuator for moving the lens of the autofocusing optical system of the RGB camera includes an amount of change in the movement distance of the lens with respect to an amount of change in the actuator control value.

17. The camera apparatus of claim 11, wherein the function includes at least one among an actuator control value of the RGB camera, an amount of change in a movement distance of a lens with respect to an amount of change in the actuator control value, and an intercept.

18. The camera apparatus of claim 17, wherein the function is expressed as in an equation below:

$$y = \left( \frac{1}{\frac{1}{f_{EFL}} - \frac{1}{x}} - b \right) \Big/ a,$$

wherein y denotes the actuator control value of the RGB camera, $f_{EFL}$ denotes a focal length of the RGB camera, x denotes a distance between an autofocusing lens of the RGB camera and the object, a denotes the amount of change in the movement distance of the lens with respect to the amount of change in the actuator control value, and b denotes the intercept.

19. The camera apparatus of claim 17, wherein the autofocusing information is generated through a focal length of the RGB camera estimated using the plurality of pieces of autofocusing calibration data and the function, the amount of change in the movement distance of the lens with respect to the amount of change in the actuator control value, and the actuator control value corresponding to a distance of an arbitrary object calculated on the basis of the intercept.

20. The camera apparatus of claim 11, further comprising a data storage unit which prestores the autofocusing information according to the distance information.

* * * * *